US005652883A

United States Patent [19]

Adcock

[11] Patent Number: 5,652,883
[45] Date of Patent: Jul. 29, 1997

[54] COMPUTER METHOD AND SYSTEM FOR CONSERVATIVE-STACK AND GENERATIONAL HEAP GARBAGE COLLECTION

[75] Inventor: James L. Adcock, Bellevue, Wash.

[73] Assignee: Microsoft Corporation, Redmond, Wash.

[21] Appl. No.: 448,238

[22] Filed: May 23, 1995

Related U.S. Application Data

[63] Continuation of Ser. No. 899,616, Jun. 15, 1992, abandoned.
[51] Int. Cl.$^6$ .................................................. G06F 12/12
[52] U.S. Cl. ...................... 395/622; 395/486; 395/497.02
[58] Field of Search .............................. 395/622, 497.01, 395/497.02, 486

[56] References Cited

U.S. PATENT DOCUMENTS

| | | | |
|---|---|---|---|
| 4,775,932 | 10/1988 | Oxley et al. | 395/600 |
| 4,797,810 | 1/1989 | McEntee et al. | 395/425 |
| 4,907,151 | 3/1990 | Bartlett | 354/200 |

FOREIGN PATENT DOCUMENTS

0 430 668  6/1991  European Pat. Off. .

OTHER PUBLICATIONS

Hans–Juergen Boehm; "Harware and Operating System Support for Conservative Garbage Collection"; *Proceedings 1991 International Workshop on Object Oriented Operating Systems*; Palo Alto, CA; 17–18 Oct. 1991; pp. 61–67.
Johnson, "The Case for a Read Barrier," *Computer Architecture News* 19 (2): pp. 279–287, Apr. 1991.
Frank Jackson, "Generation Scavenging," *Dr. Dobb's Journal*, May 1990, pp. 16–28.
Robert Courts, "Improving Locality of Reference in a Garbage–Collecting Memory Management System," *Communications of the ACM*, vol. 31, No. 9, Sep. 1988, pp. 1128–1138.

David Ungar and Frank Jackson, "Tenuring Policies for Generation–Based Storage Reclamation," *OOPSLA '88 Conference Proceedings*, The Association for Computing Machinery, San Diego, California, Sep. 25–30, 1988, pp. 1–17.
Joel F. Bartlett, "Compacting Garbage Collection with Ambiguous Roots," *Digital Equipment Corporation Western Research Lab Report*, Palo Alto, California, Feb. 1988, pp. 1–35.
Hans–Juergen Boehm and Mark Weiser, "Garbage Collection in an Uncooperative Environment," *Journal of Software Practice and Experience*, vol. 18, No. 9, Sep. 1988, pp. 807–820.
Alan Demers et al., "Combining Generational and Conservative Garbage Collection: Framework and Implementations," Seventeenth Annual ACM Symposium on Principles of Programming Conference *The Association of Computing Machinery*, Palo Alto, California, 1990, pp. 261–269.

(List continued on next page.)

*Primary Examiner*—Paul V. Kulik
*Assistant Examiner*—Jack M. Choules
*Attorney, Agent, or Firm*—Seed and Berry LLP

[57] ABSTRACT

A method and system for conservative-stack and generational garbage collection for a computer memory is provided. In a preferred embodiment, the computer memory includes a stack and a heap. The heap comprises a plurality of objects each of which is identified as new or old. During run time, a list of old objects that contain pointers to new objects is maintained. During garbage collection time, each new object that is accessible through an old object in the list is marked as accessible. The stack contains a plurality of stack entry that may be pointers to new objects. During garbage collection time, each stack entry is checked to see if it could point to a new object. Each new object that a stack entry could point to is marked as accessible and each new object that is accessible through the marked objects is also marked as accessible. During memory compaction, the new objects that are not marked as accessible are reclaimed.

16 Claims, 9 Drawing Sheets

OTHER PUBLICATIONS

Paul R. Wilson and Thomas G. Moher, "Design of the Opportunistic Garbage Collector," *OOPSLA '89 Proceedings*, The Association for Computing Machinery, Oct. 1–6, 1989, pp. 23–35.

David Ungar, "Generation Scavenging: A Non–disruptive High Performance Storage Reclamation Algorithm," *1984 ACM Conference Proceedings*, Pittsburgh, Pennsylvania, Apr. 1984, pp. 83–136.

Lang, B. and Dupont, B., "Incremental Incrementally Compacting Garbage Collection", Programing Of Future Generation Computers II, Proceedings of the Second Franco–Japanese Symposium; pp. 163–182 Nov. 1987.

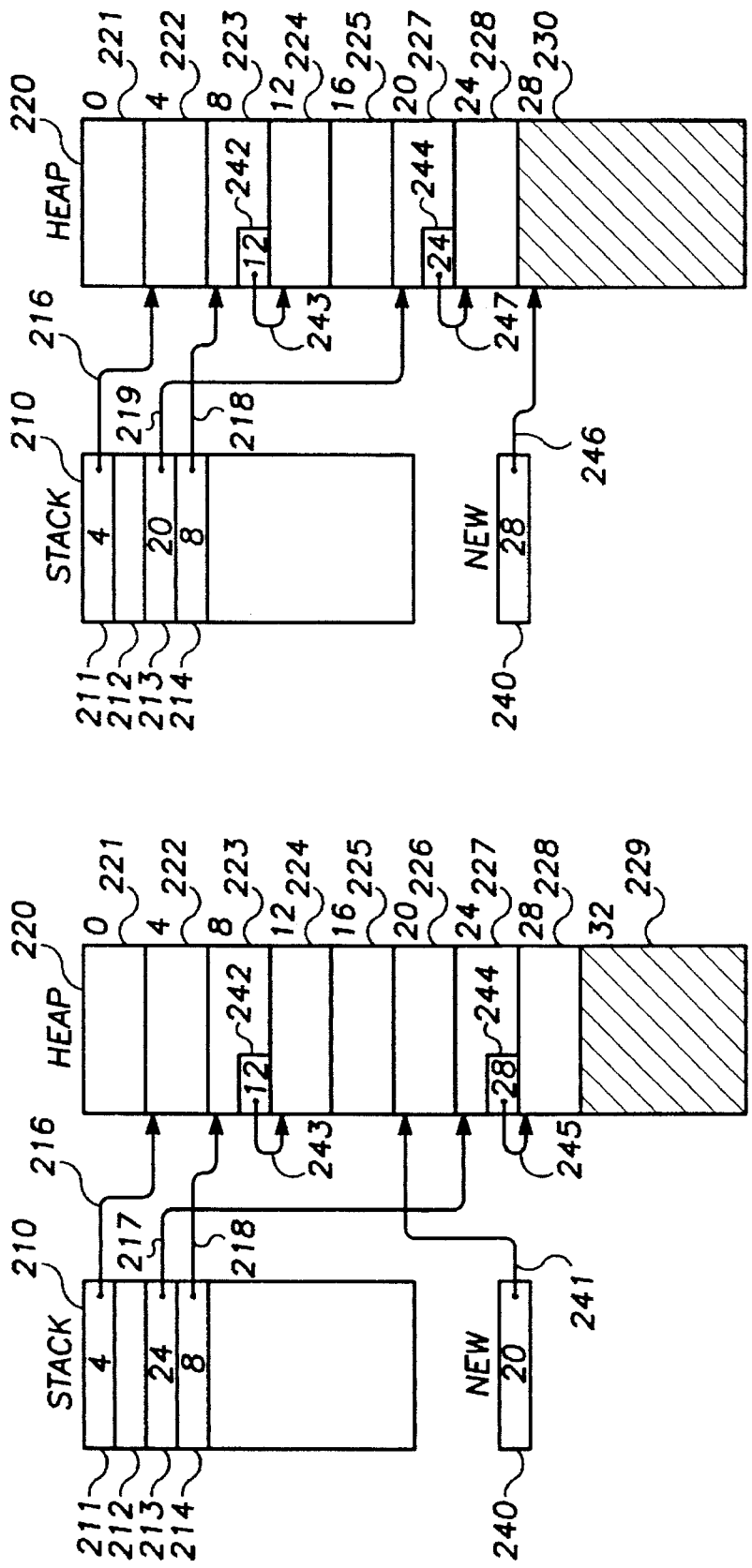

COMPUTER METHOD AND SYSTEM FOR CONSERVATIVE-STACK AND GENERATIONAL HEAP GARBAGE COLLECTION

CROSS-REFERENCE TO RELATED APPLICATION

This application is a continuation of U.S. patent application Ser. No. 07/899,616, filed Jun. 15, 1992, now abandoned.

TECHNICAL FIELD

This invention relates generally to a computer method and system for memory garbage collection and, more particularly, to a method and system for garbage collection that uses a conservative approach to stack pointers and generational approach to reclaim objects.

BACKGROUND OF THE INVENTION

Computer systems may manage computer memory dynamically. Dynamic memory management refers to the process by which blocks of memory are allocated temporarily for a specific purpose and then deallocated when no longer needed for that purpose. Deallocated blocks are available for reallocation for another purpose. The process that dynamically manages the memory is referred to as the memory manager. The memory that the memory manager manages is referred to as a "heap." When a program needs a block of memory to store data, the program sends a request to the memory manager. The memory manager allocates a block of memory in the heap to satisfy the request and sends a pointer to the block of memory to the program. The program can then access the block of memory through the pointer.

In the case of programs written in certain languages, such as C++, blocks of memory (a block of memory is often referred to as an object) can be allocated automatically or dynamically. Automatic objects are automatically allocated when a procedure is entered and automatically deallocated when the procedure is exited. Conversely, dynamic objects are allocated by an explicit call to the memory manager and deallocated by either an explicit call to the memory manager or automatically through a technique known as garbage collection. Typically, automatic objects are stored in a stack and dynamic objects are stored in a heap.

A program can only access a dynamic object through a pointer. A pointer is a memory location that contains the address of an object. If the program overwrites the pointer, then the corresponding object becomes "inaccessible" to the program. An object may be pointed to by several pointers. Only when all the pointers are overwritten, or are part of another inaccessible object, does the object become inaccessible. An inaccessible object is one in which the program cannot retrieve data from or write data to. Garbage collection is the process of dynamic memory management that detects and recovers objects that are no longer accessible by the program and thus are candidates for deallocation and subsequent reallocation.

There are two basic techniques for determining whether an object is accessible. The reference-counting technique tracks if an object is accessible by incrementing a pointer count in the object every time a new pointer is set to point to the object and decrementing the pointer count every time a pointer that points to the object is overwritten. The reference-counting technique is expensive. In some implementations, it may take an extra 50 bytes of code for every pointer assignment to increment and decrement the pointer count. Also, it may be difficult to identify inaccessible objects in certain situations. For example, if object A contains a pointer to object B, object B contains a pointer to object A, and the pointer count for object A is 1 and for object B is 1, then objects A and B are effectively inaccessible, even though these pointer counts are not 0.

The other garbage collection technique for determining which objects are accessible does not track pointers to an object. Rather, when more heap memory is needed for allocation, the garbage collector identifies objects which are accessible by checking all the pointers in the program and marking each object to which a pointer points as accessible. When this marking is complete, all objects that are not marked as accessible are inaccessible and available for deallocation. Typically, the garbage collector checks every pointer in the memory (heap and stack). However, it may be very difficult to identify whether a certain memory location contains a pointer or some other value. For example, the following C++ declaration indicates that an object A may be a pointer to an object some of the time and may be an integer value at other times.

```
union A
{
    long    value;
    object* reference;
}
```

A garbage collector would not know whether object A contains a pointer or an integer unless the program set an indicator with each assignment to this object. This type of tracking is very expensive. Without this type of tracking, if object A contained an integer value that happened to contain the same bit pattern as a pointer to an object, then the garbage collector could not be certain whether it is really an integer or a pointer. A memory location that could be a pointer sometimes and not a pointer other times is referred to as a "may-be-pointer." A "conservative" approach to garbage collection does not track each assignment of a may-be-pointer. Rather, it assumes that object A is a pointer and treats the object to which it may point as being accessible. With this approach, the garbage collector may mark an object as accessible when it is really inaccessible.

Conservative garbage collectors have problems compacting memory. During memory compaction, all accessible objects are typically moved to one end of the heap (the allocated objects) with free space (the deallocated objects) occupying the other end. When the garbage collector moves an object, it must update all pointers to that object to reflect its new location. However, the conservative garbage collector cannot change the value of a may-be-pointer because if the may-be-pointer really contained a non-pointer value, then the garbage collector would be introducing an error into the program. Consequently, conservative garbage collectors typically do not compact memory.

Because garbage collection can be time-consuming, some garbage collectors use a technique called generational collecting. A generational garbage collector divides the objects in the heap into two categories: new objects (recently created) and old objects (not recently created). This technique uses the assumption that recently created objects generally become inaccessible quickly, while older objects typically stay accessible for awhile. Thus, a generational garbage collector deallocates new objects, but not old objects. A generational garbage collector trades off completeness of the garbage collection (some old objects may be inaccessible) for a faster garbage collection process.

FIGS. 1A and 1B show a sample stack and heap before and after garbage collection using a conservative approach. FIG. 1A shows stack 110 and heap 120 before garbage collection. Stack 110 contains five stack entries 111–115 with values of 4, 23, 12, 64, and 16. Heap 120 contains 8 objects 121–128 at locations 0, 4, 8, 12, 16, 20, 24, and 28 and free space 129 at location 32. Stack entry 111 is defined to be a pointer only; stack entries 112–114 may be a pointer or integer; and stack entry 115 is an integer. Stack entry 111 contains a pointer 118 to object 122. Stack entry 112 does not currently contain a pointer because its value, 23, does not correspond to the address of any object. Stack entry 113 may contain a pointer 116 (indicated by the dashed line) since there is an object at location 12. Stack entry 114 does not currently contain a pointer because its value, 64, would point to an object in free space. Stack entry 115 is not a pointer, even though its value, 16, corresponds to the location of an object. Object 122 in heap 120 contains a field 117 that may be a pointer to object 123 or an integer. Objects 121, 125, 126, 127, and 128 are inaccessible because there are no pointers to these objects. Object 122 is accessible because pointer 118 points to it. Objects 123 and 124 may be accessible because stack entry 113 and field 119 may point to these objects.

FIG. 1B shows the stack 110 and heap 120 after garbage collection using a conservative approach. In this example, the conservative garbage collector knows whether a memory location contains a pointer, does not contain a pointer, or contains a may-be-pointer. However, it does not track whether a may-be-pointer currently contains a pointer. Heap 120 contains accessible object 122 and the objects that may be accessible, 123 and 124. The inaccessible objects 121, 124–128 have been reclaimed (deallocated) into free spaces 130 and 131. Object 122 has been moved and its corresponding pointer, stack entry 111, has been modified to point to the new location. Objects 123 and 124 have not been moved because the garbage collection process could not be sure whether stack entry 113 or field 119 was an integer or a pointer.

FIGS. 2A and 2B show a sample stack and heap before and after garbage collection using a generational approach. FIG. 2A shows stack 210 and heap 220 before garbage collection using a generational approach. Stack 210 contains three stack entries 211, 213, 214 that are pointers. Heap 220 contains 8 objects 221-228 and free space 229. Pointer 240 is maintained by the garbage collector and points to the start of the new objects. Stack entry 211 points to object 222; stack entry 213 points to object 227; and stack entry 214 points to object 223. Object 223 contains a pointer 242 to object 224, and object 227 contains a pointer 244 to object 228. Objects 221 through 225 are old objects, and objects 226 through 228 are new objects. Objects 222, 223, 224, 227, and 228 are accessible, and objects 221, 225, and 226 are inaccessible.

FIG. 2B shows stack 210 and heap 220 after garbage collection using a generational approach. Since a generational approach was used, the inaccessible old objects 221 and 225 were not reclaimed (deallocated). Only object 226, which is new and inaccessible, was reclaimed. Stack entry 213 was updated to reflect the new location of object 227, and pointer 244 was updated to reflect the new location of object 228. Free space 230 reflects the reclamation of object 226. Pointer 240 was updated to point to the start of the new objects.

SUMMARY OF THE INVENTION

It is an object of the present invention to provide an improved garbage collection process for a computer memory.

It is another object of the present invention to provide a garbage collection process that combines advantages of a conservative and generational garbage collection techniques.

It is another object of the present invention to provide a method for identifying inaccessible objects in a computer memory.

These and other objects, which will become apparent as the invention is more fully described below, are obtained by an improved method and system for identifying inaccessible objects in a computer memory. In a preferred embodiment, the memory includes a stack and a heap, the heap includes old and new objects, the objects are identified by pointers, and the stack has stack entries that may be pointers. In a preferred embodiment, when an old object contains a pointer that is set to point to a new object, the old object is added to remember list. During garbage collection, each stack entry is considered a may-be-pointer. Then, each new object that might be pointed to by a stack entry is marked as accessible, each new object that is pointed to by an old object in the remember list is marked as accessible, and each new object that is accessible through a previously marked object is marked accessible. When this process is complete, all the new objects that have not been marked as accessible are inaccessible.

BRIEF DESCRIPTION OF THE DRAWINGS

FIGS. 2A and 2B show a sample stack and heap before and after garbage collection using a generational approach.

DETAILED DESCRIPTION OF THE INVENTION

The present invention provides an improved garbage collection technique that combines conservative and generational garbage collection techniques. In a preferred embodiment, the garbage collector conservatively assumes each stack entry points to an object and uses an exact method to determine whether a global variable is a pointer and whether field within an object in the heap is a pointer. It is also preferred that the garbage collector reclaims only new objects.

During run time of the program, a list of old objects that contain a pointer to a new object is maintained. If the object containing the pointer is old and the object pointed to is new, then the old object is added to a remember list. In a preferred embodiment, a compiler generates code that performs this checking and adding to the remember list for each pointer assignment statement. The compiler also generates a virtual function for each class of objects. One of these virtual functions returns a list of the pointers contained in the object, and another returns the size of the object. The compiler generates code to track exactly whether a may-be-pointer in an object currently contains a pointer.

In a preferred embodiment, the memory manager logically divides the heap into a new space and an old space. The memory manager allocates new objects from the new space. In a preferred embodiment, the garbage collector is implemented on a processor with a segmented architecture, such as the Intel 80386.

Any accessible new object is accessible either through a stack entry or through an old object on the remember list. Thus, by processing the stack entries and the objects in the remember list, the garbage collector can determine which new objects are accessible or might be accessible. In a preferred embodiment, the garbage collector treats each stack entry conservatively, that is, it assumes that each stack entry is a may-be-pointer. The garbage collector marks each new object that may be pointed to by a stack entry as locked and accessible and each new object that is accessible from the locked object as accessible. The garbage collector then processes each object in the remember list by visiting each new object that is accessible through that old object and marking it as accessible. After the marking is complete, the garbage collector compacts the memory in the new segment.

Figure 1B:
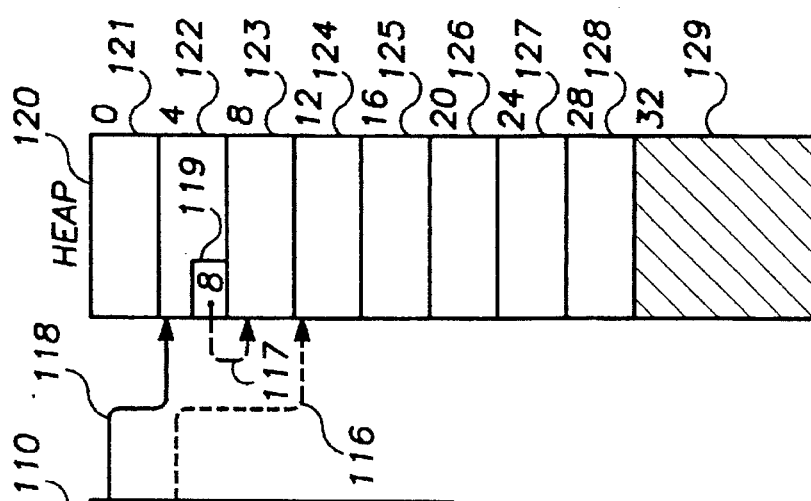
FIGS. 1A and 1B show a sample stack and heap before and after garbage collection using a conservative approach.
Figure 1A:
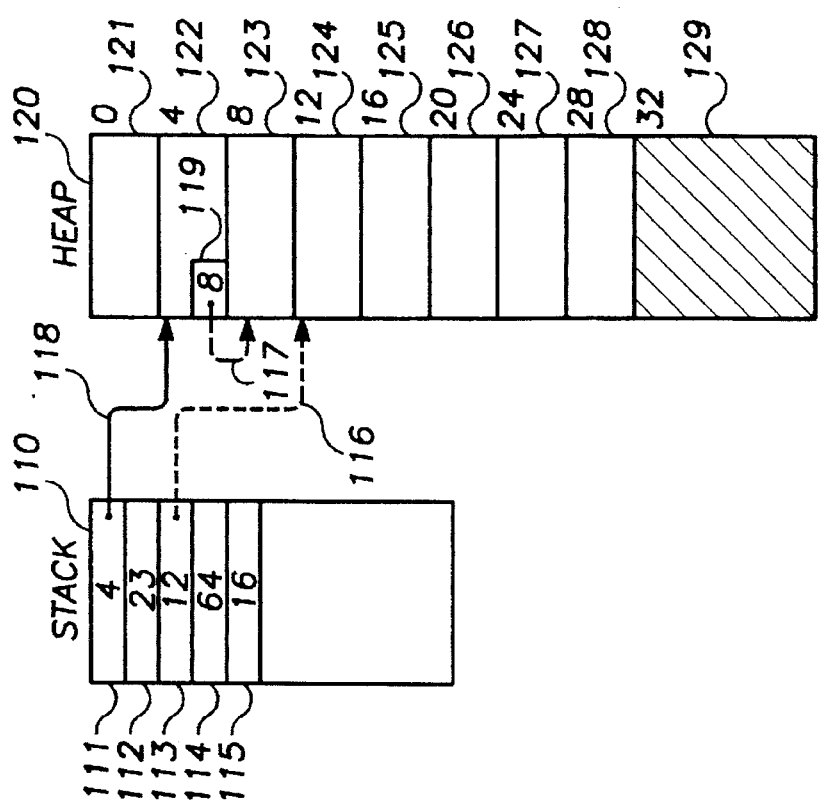
Figure 3:
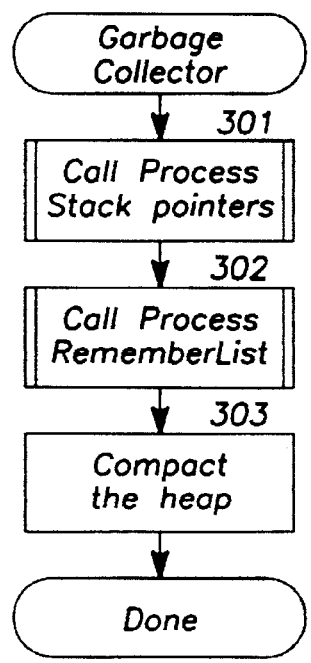
FIG. 3 is an overview flow diagram of the garbage collector procedure in a preferred embodiment.

FIG. 3 is an overview flow diagram of the garbage collector procedure in a preferred embodiment. In step 301, the garbage collector invokes routine ProcessStackPointers to conservatively mark all new objects that may be accessible through the stack entries. In step 302, the garbage collector invokes routine ProcessRememberList to mark all new objects that may be accessible through the old objects in the RememberList. In step 303, the garbage collector compacts the new segment of the heap.

Figure 4:
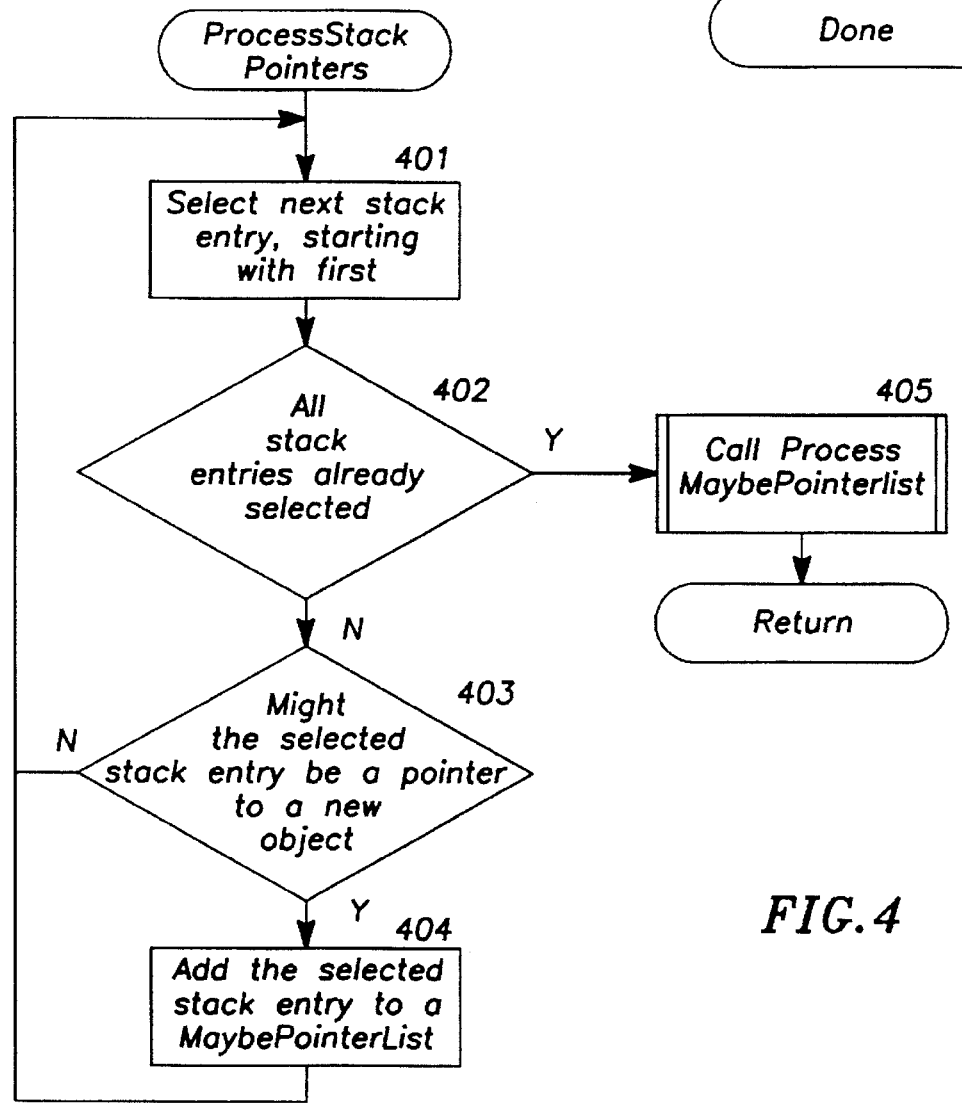
FIG. 4 is a flow diagram of routine ProcessStackPointers in a preferred embodiment.

FIG. 4 is a flow diagram of routine ProcessStackPointers in a preferred embodiment. In steps 401 through 404, the garbage collector processes each stack entry to determine whether it might be a pointer to a new object or whether it is definitely not a pointer to a new object. If it might be a pointer to a new object, the garbage collector adds the stack entry to a list of may-be-pointers for later processing. In step 401, the garbage collector selects the next stack entry starting with the first. In step 402, if all the stack entries have already been selected, then the garbage collector continues at step 405, else the garbage collector continues at step 403. In step 403, if the selected stack entry might be a pointer to a new object, then the garbage collector adds the selected stack entry to the MaybePointerList in step 404 and loops to step 401 to select the next stack entry, else the garbage collector loops to step 401. In a preferred embodiment, new objects are allocated space in a single segment. Thus, the pointers to the new objects have a segment selector equal to that of the new segment. The stack entry might be a pointer to a new object when its selector portion points to the new segment and offset portion is within the limit of the new segment. In step 405, the garbage collector invokes the routine ProcessMaybePointerList to conservatively mark the objects that might be pointed to by the stack entries in the MaybePointerList. The garbage collector then returns.

Figure 5:
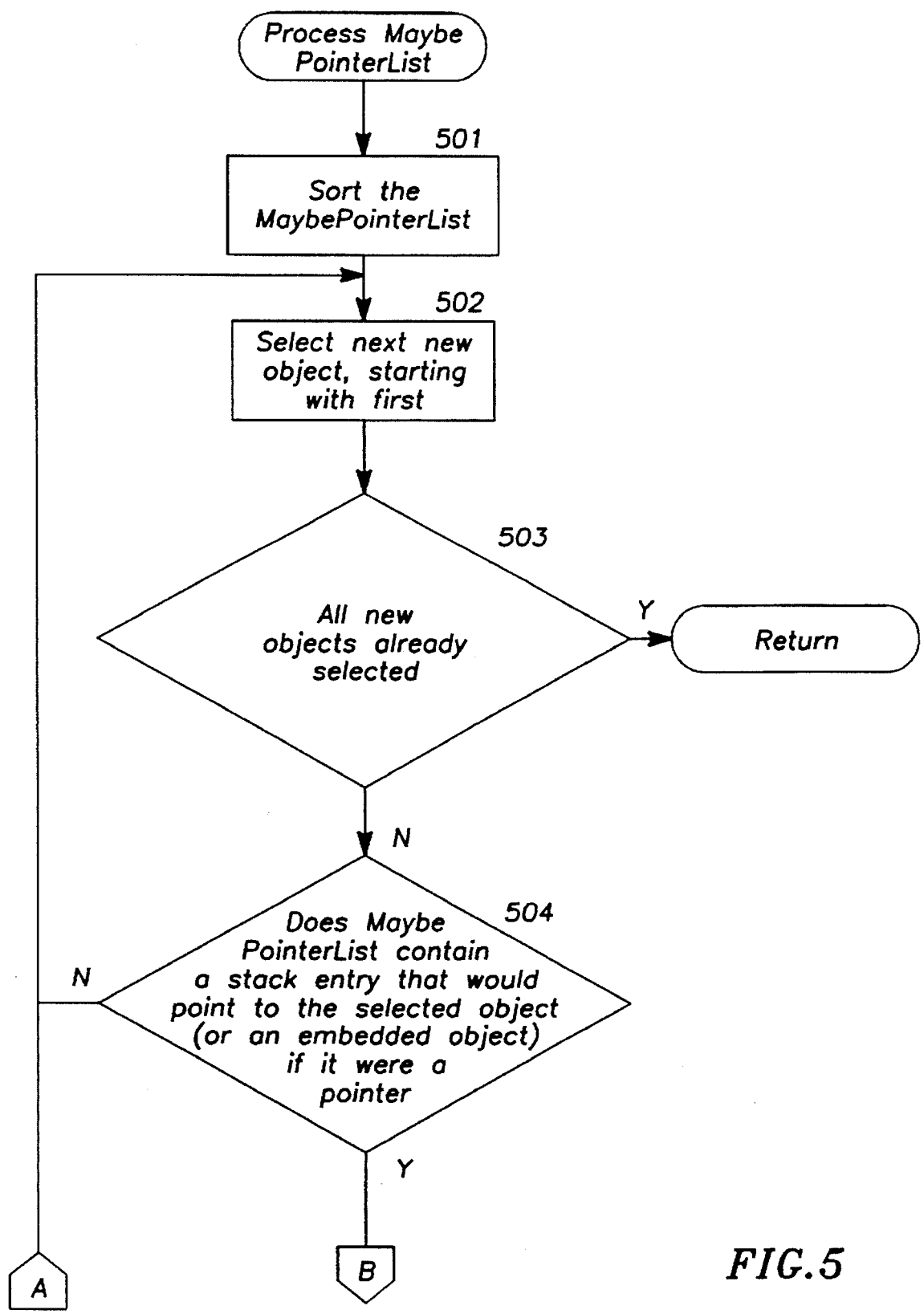
FIG. 5 is a flow diagram of routine ProcessMaybePointerList in a preferred embodiment.
Figure 5:
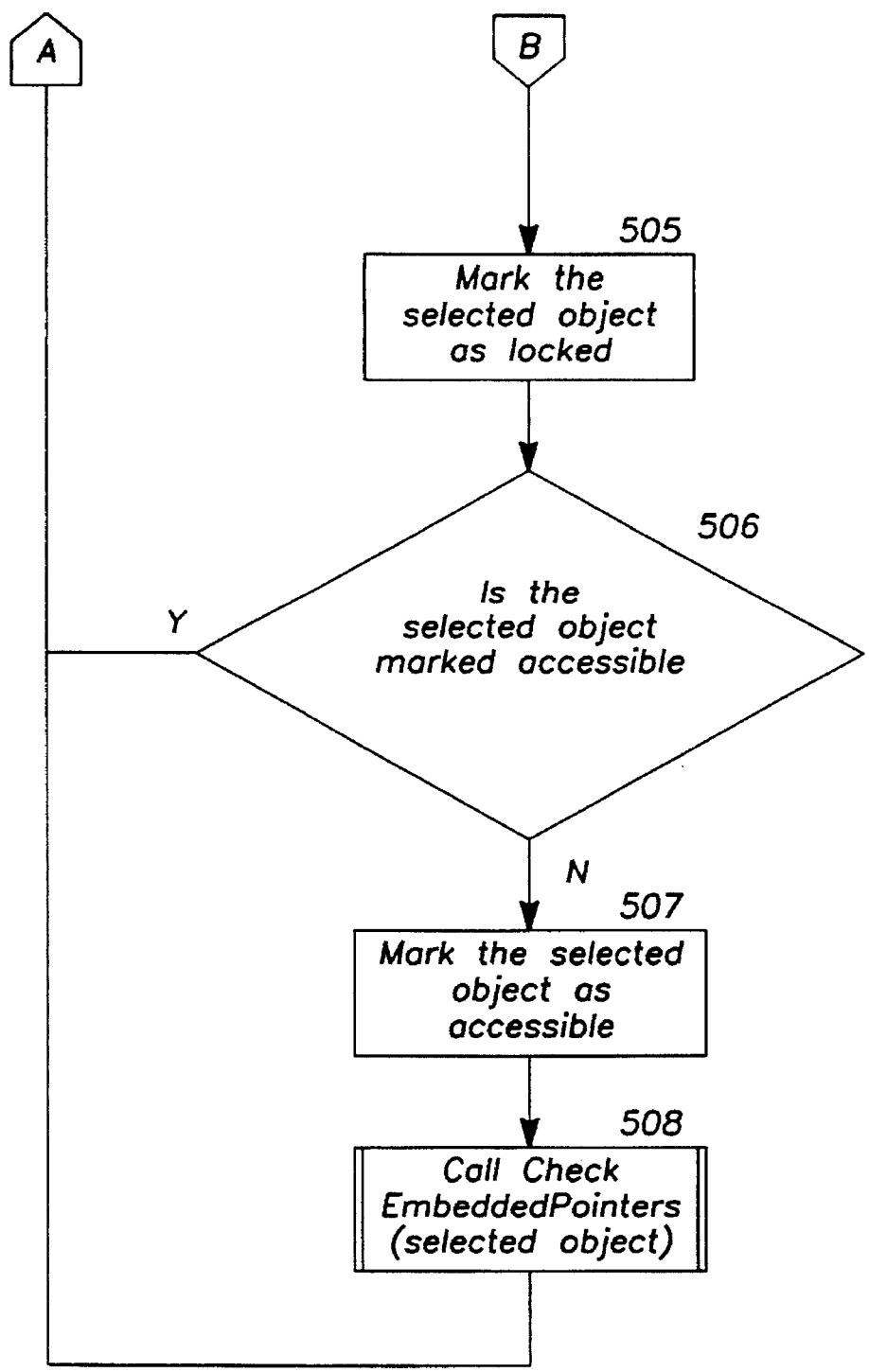

FIG. 5 is a flow diagram of routine ProcessMaybePointerList in a preferred embodiment. This routine processes the entries in the MaybePointerList by marking all new objects that might be pointed to as locked and accessible. The routine also marks the new objects that are accessible through these objects as accessible. In step 501, the garbage collector sorts the MaybePointerList. In step 502, the garbage collector selects the next new object in the heap starting with the first new object. In step 503, if all the new objects have already been selected, then the garbage collector returns, else the garbage collector continues at step 504. In step 504, if the MaybePointerList contains a stack entry that would point to the selected object or an object embedded in the selected object if it were a pointer, then the garbage collector continues at step 505, else the garbage collector loops to step 502 to select the next new object. In step 505, the garbage collector marks the selected object as locked. The selected object may have already been marked as accessible because it is accessible through a new object already marked as accessible. It is nevertheless now marked as locked so that it will not be moved during heap compaction. In step 506, if the selected object is already marked as accessible, then the embedded pointers have already been processed to determine which new objects are accessible through them and the garbage collector loops to step 502 to select the next new object, else the garbage collector continues at step 507. In step 507, the garbage collector marks the selected object as accessible. In step 508, the garbage collector invokes routine CheckEmbeddedPointers passing it the selected object and then loops to step 502 to select the next new object. This routine, as explained below in detail, marks all new objects (not already marked as accessible) that are accessible from the passed object (except those new objects that can only be accessed from the passed object through an old object) as accessible.

Figure 6:
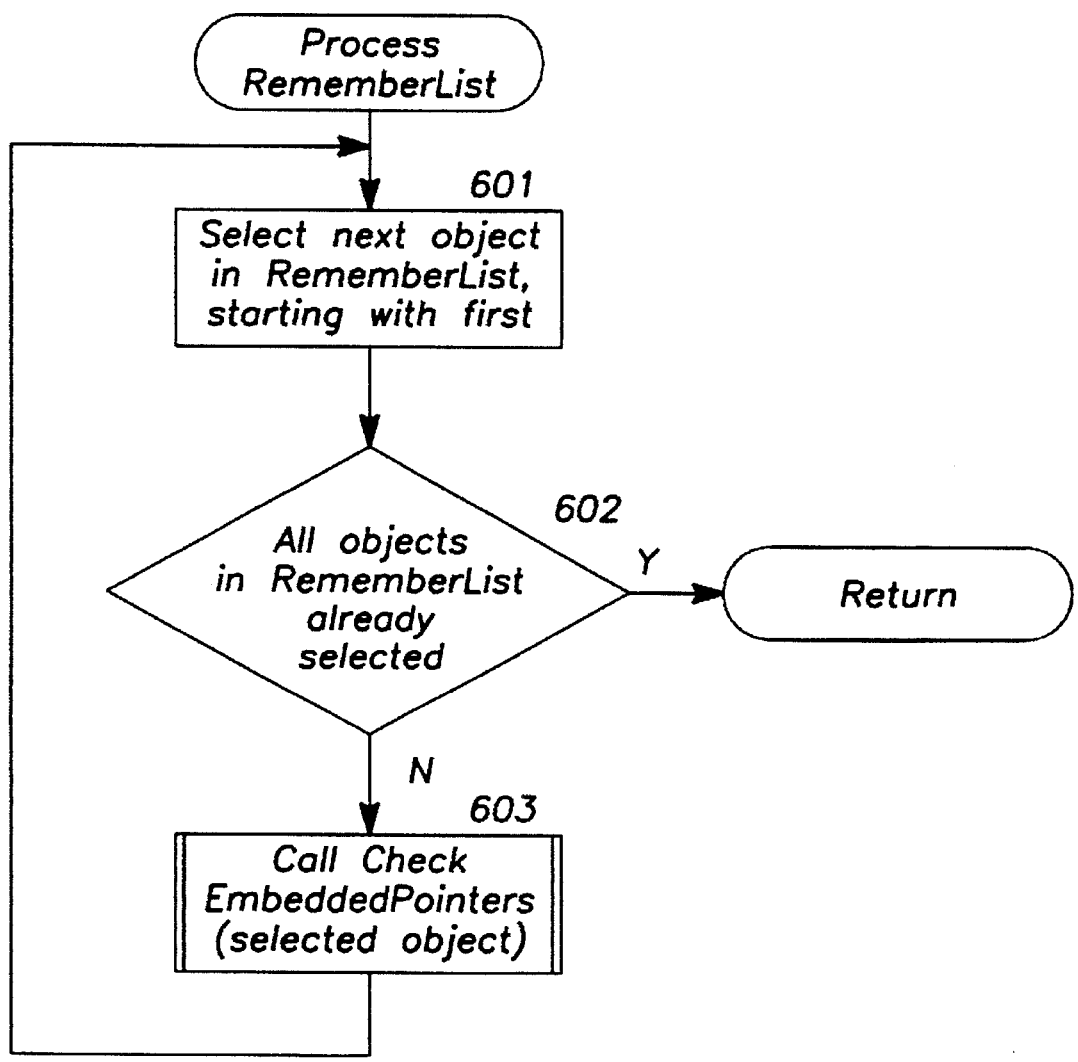
FIG. 6 is a flow diagram of routine ProcessRememberList in a preferred embodiment.

FIG. 6 is a flow diagram of routine ProcessRememberList in a preferred embodiment. This routine processes each old object in the RememberList to mark each new object that is accessible through it as accessible. In step 601, the garbage collector selects the next object in the RememberList starting with the first. In step 602, if all the objects in the RememberList have already been selected, then the garbage collector returns, else the garbage collector continues at step 603. In step 603, the garbage collector invokes routine CheckEmbeddedPointers passing it the selected object and then loops to step 601 to select the next object.

Figure 7:
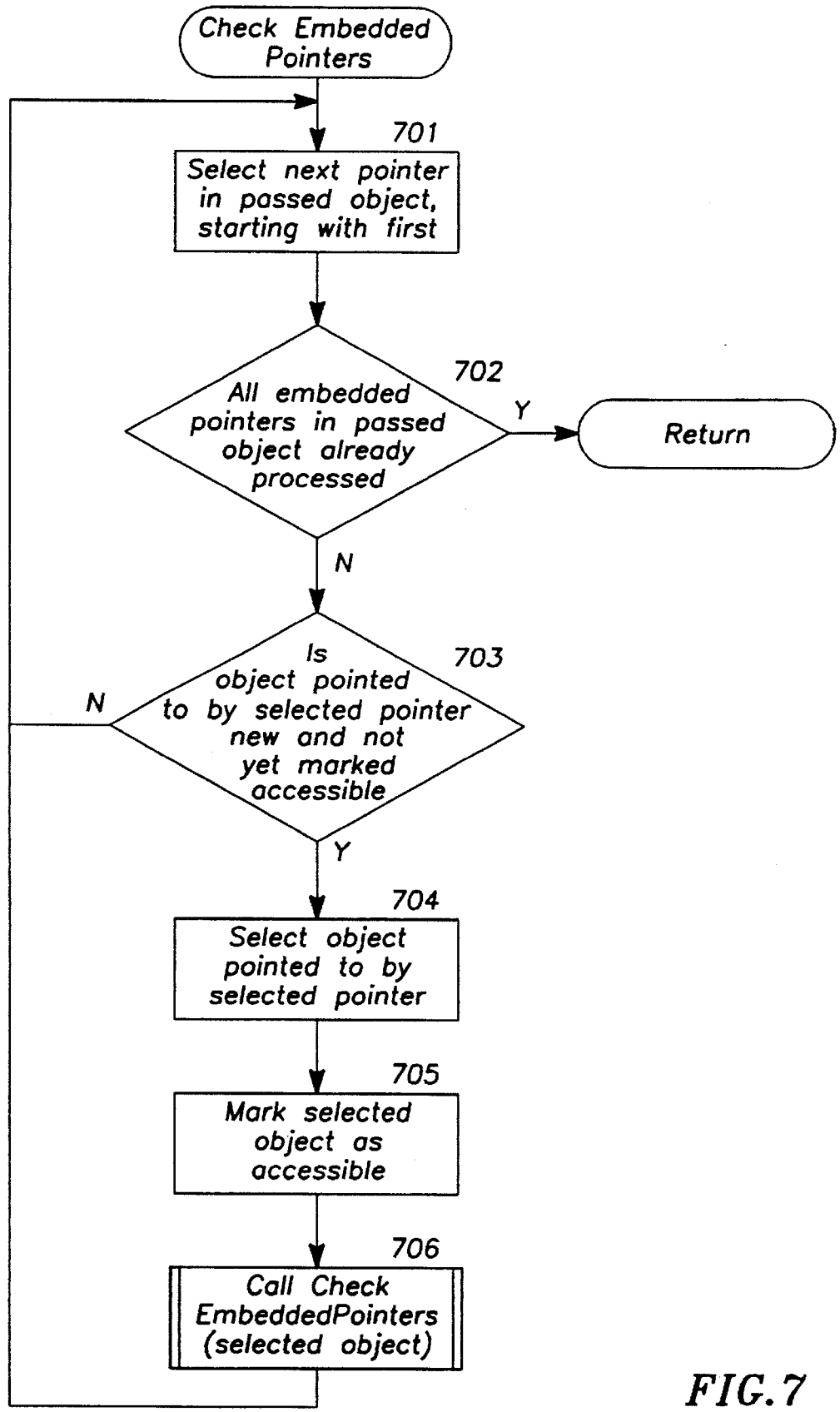
FIG. 7 is a flow diagram of routine CheckEmbeddedPointers in a preferred embodiment.

FIG. 7 is a flow diagram of routine CheckEmbeddedPointers in a preferred embodiment. This routine is passed an object and sets each new object (not already marked as accessible) that is accessible through pointers embedded in the passed object (except those new objects that can only be accessed from the passed object through an old object) as accessible. This routine is invoked recursively to process each new object pointed to by the pointers contained in the passed object. One skilled in the art would appreciate that this routine could be implemented in a non-recursive manner. When this routine encounters a pointer to an old object, it does not process the pointers in that old object because if the old object contains a pointer to a new object then the old object is on the RememberList and the garbage collector processes it that way. In step 701, the garbage collector selects the next pointer in the passed object starting with the first. In a preferred embodiment, a virtual function is defined for each class of objects which, when invoked, provides the pointers contained in the object. In step 702, if all the embedded pointers for the passed object have been processed, then the garbage collector returns, else the garbage collector continues at step 703. In step 703, if the object pointed to by the selected pointer is new and not already marked accessible, then the garbage collector continues at step 704, else the garbage collector loops to step 701 to select the next embedded pointer. If the selected pointer is null, then it does not point to a new object. If the object is already marked accessible, then all new objects accessible from it (except those new objects that can only be accessed from the passed object through an old object) have been marked as accessible. In step 704, the garbage collector selects the object pointed to by the selected pointer. In step 705, the garbage collector marks the selected object to accessible. In step 706, the garbage collector recursively invokes routine CheckEmbeddedPointers passing the selected object and then loops to step 701 to select the next embedded pointer.

The preferred compaction algorithm of the present invention moves each object that is marked and not locked to one end of the heap. The moved objects retain their relative position to one another. This maintaining of the relative position tends to improve the locality of references. An object generally tends to reference objects that are created about the same time. Thus, the maintaining of the relative position ensures that an object will be spatially near objects created in the same temporal vicinity, except for objects that are locked. Since objects that are locked are not moved, they may become spatially separated from objects created in the same temporal vicinity. The improved locality of references is especially important in reducing page faults in a computer system with virtual memory.

When objects are moved, they can be stored near an object that is locked. If the space between an object that is locked and a moved object is not large enough to hold the next object to be moved, then a dummy object is created and moved to that space. A dummy object is large enough to fill that space and has an associated virtual function table. Since no pointer can reference the dummy object, the dummy object is reclaimed during the next garbage collection.

When the moving of the objects is complete, a list is made of areas of contiguous sections of free space. The free space would be contiguous except for objects that are marked and locked. The allocation of new objects occurs from this free space.

Figures 8A, 8B:
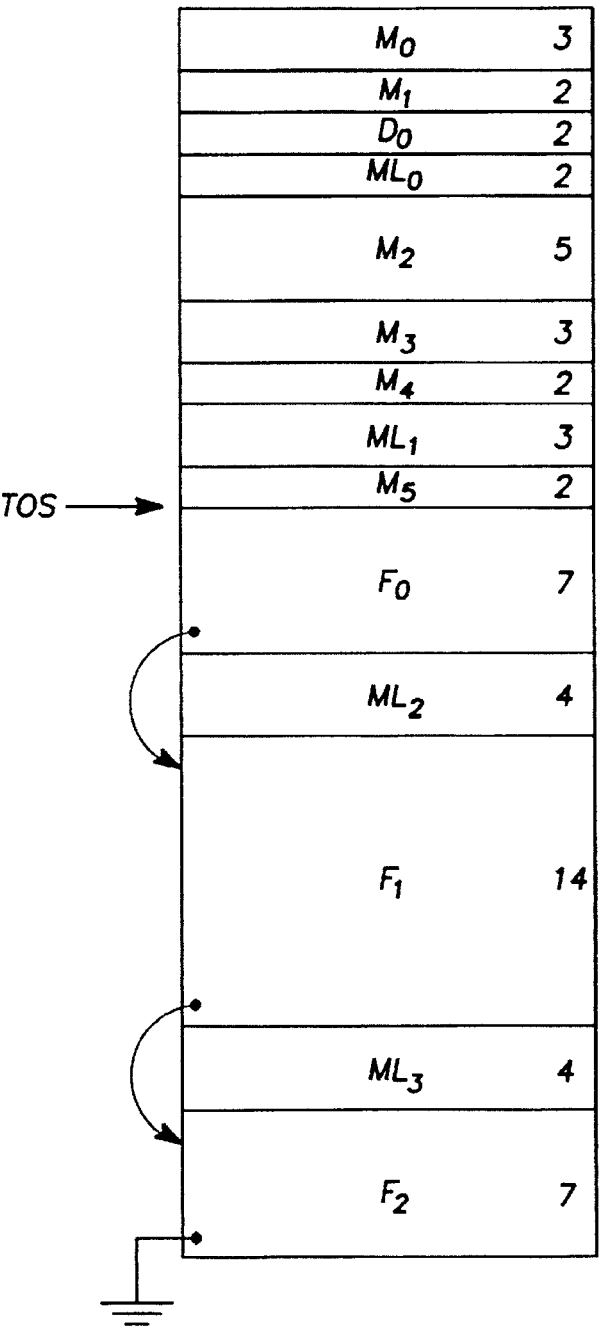
FIG. 8A shows a sample new space of a heap after all the accessible objects are marked.
FIG. 8B shows the sample new space of a heap after compaction.

FIG. 8A shows a sample new space after all the accessible objects are marked. The objects that are marked and are not locked are $M_0$, $M_1$, $M_2$, $M_3$, $M_4$, and $M_5$. The objects that are marked and are locked are $ML_0$, $ML_1$, $ML_2$, and $ML_3$. The objects that are not marked are $U_0$, $U_1$, $U_2$, $U_3$, $U_4$, $U_5$, $U_6$, and $U_7$. The numbers in the lower right corner of each object represent the size of the object. FIG. 8B shows the sample new space of a heap after compaction. The object marked $D_0$ is a dummy object. The free space is identified by $F_0$, $F_1$, and $F_2$, which are linked together. The pointer TOS indicates the top of the space after the compaction is complete. During the compaction process, it was determined that the object $M_2$ with a size of 5 would not fit into a space with a size of 2. Consequently, dummy object $D_0$ with a size of 2 was created and inserted into the space with a size of 2. Although object $M_4$ with a size of 2 would fit into that space, it was not moved because to do so would change the relative order of the objects that are marked and not locked.

Figure 9:
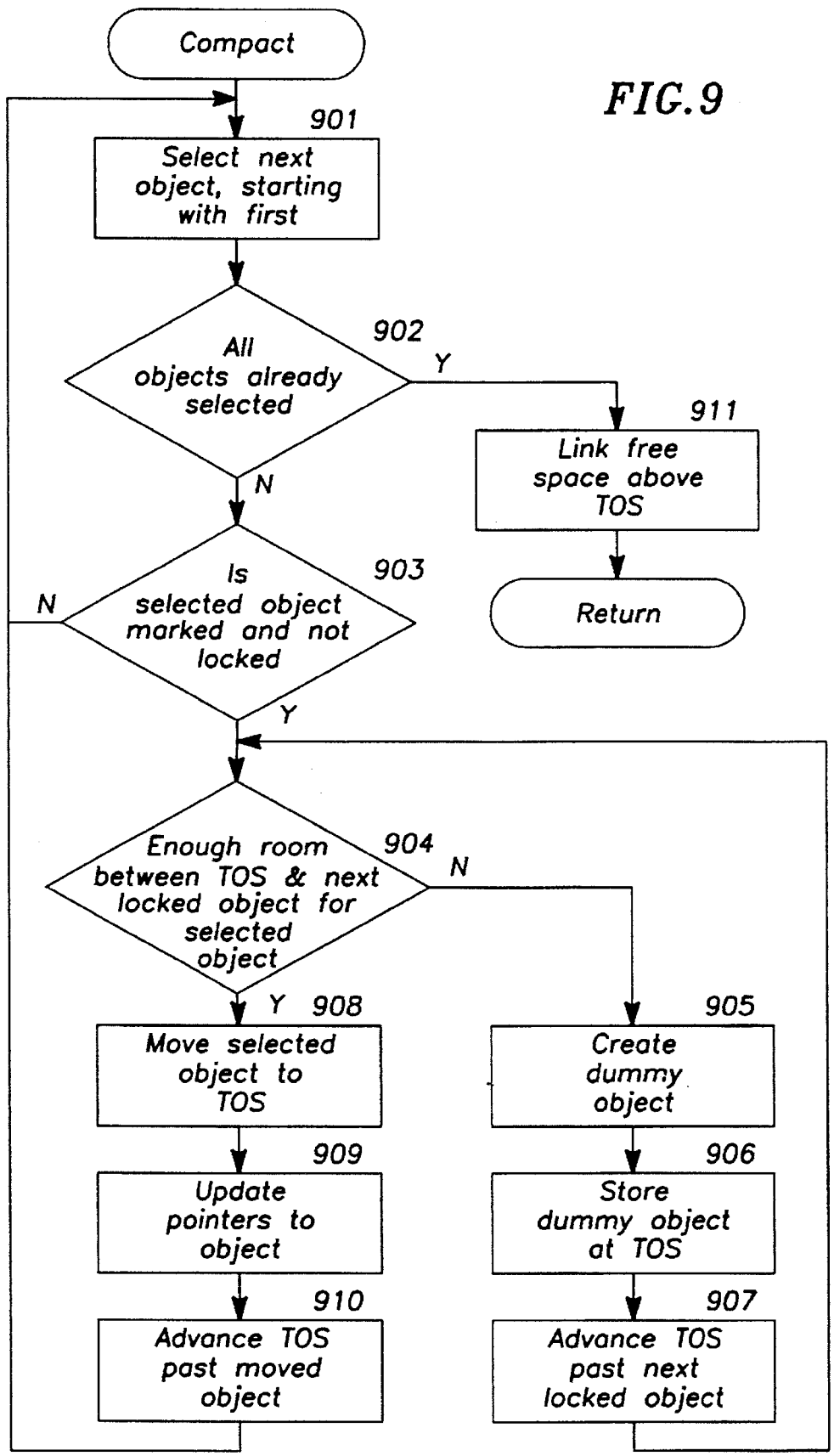
FIG. 9 is a flow diagram of a compaction routine in a preferred embodiment of the present invention.

FIG. 9 is a flow diagram of a compaction routine in a preferred embodiment of the present invention. This routine initializes a top of space (TOS) pointer to point to the first object in the new space. The TOS pointer points to the next location to which an object can be moved. In step 901, the compactor selects the next object in the new space starting with the first. In step 902, if all the objects have already been selected, then the compactor continues at step 911, else the compactor continues at step 903. In step 903, if the selected object is marked and is not locked, then the selected object is to be moved and the compactor continues at step 904, else the compactor loops to step 901 to select the next object. In step 904, if there is enough space between the TOS and the next locked object, then the object can be moved to the TOS and the compactor continues at step 908, else the compactor continues at step 905. The next locked object refers to the closest locked object that is between the TOS and the end of the new space. If there is no such locked object, the space is considered to span from the TOS to the end of the new space. In steps 905 through 907, the compactor fills the space between the TOS and the next locked object with a dummy object. If the TOS points to the next locked object, then no dummy object is needed and steps 905 through 907 are skipped. A dummy object has a virtual function that returns the size of the object, and a virtual function that returns an indication that there are no pointers in the object. During the next garbage collection after being created, a dummy object is not marked as accessible (there are no pointers to it) and is therefore reclaimed. In step 905, the compactor creates a dummy object large enough to fill the space between the TOS and the next locked object. In step 906, the compactor stores the dummy object at the TOS. In step 907, the compactor advances the TOS past the next locked object and loops to step 904 to check whether there is enough space between the advanced TOS and the new next locked object. In step 908, the compactor moves the selected object to the TOS. In step 909, the compactor updates the pointers to the moved object. During the process of marking the objects, the garbage collector created a list of all pointers that point to each marked object. In step 910, the compactor advances the TOS past the moved object and loops to step 901 to process the next object. In step 911, the compactor links the free space above the TOS and returns.

At completion of the compaction routine, the TOS defines the start of the new space and the end of the old space. The remember list is preferably updated by removing the old objects that no longer point to objects in the new space. One skilled in the art would appreciate that this updating could be performed by the compaction routine when an object is moved. As shown in FIG. 8B, since the new space may contain locked objects, e.g., $ML_2$ and $ML_3$, the remember list after compaction may contain old objects that point to these locked objects in the new space. Alternatively, the remember list would not be updated until a new space is defined in such a way that the new space contains no objects. When such a definition occurs, all old objects can be removed from the remember list since there are no objects in the new space to point to. For example, the new space of FIG. 8B could be defined to contain no objects by defining the new space to start at object F2 or to start in a different segment when implemented on a computer with a segmented architecture. With such definition, the old space may contain free space. If the new space is defined to start at a location other than TOS, then during the next compaction the compaction routine would preferably move objects to the location pointed to by TOS, rather than resetting TOS to point to the new space. Thus, any free space within the old space would be filled in during compaction.

Although the present invention has been described in terms of preferred embodiments, it is not intended that the invention be limited to these embodiments. Modifications within the spirit of the invention will be apparent to those skilled in the art. The scope of the present invention is defined by the claims that follow.

What is claimed is:

1. A method in a computer system for marking data objects in a computer memory, each object being identified by a pointer, the memory including a stack and a heap, the heap having a plurality of old objects and a plurality of new objects, the memory including a list of pointers to a plurality of old objects that contain a pointer to a new object, the stack having stack entries, each stack entry identifiable as being definitely not a pointer or being possibly a pointer, the method comprising the steps of:

identifying whether each stack entry is definitely not a pointer or possibly a pointer;

for each new object possibly pointed to by a stack entry that is identified as possibly a pointer, marking the new object as accessible and locked, and marking each new object that is accessible through the marked object as accessible; and for each old object that is pointed to by a pointer in the list of pointers, marking each new object that is pointed to by a pointer contained in the old object as accessible and marking each new object that is accessible through the marked objects as accessible so that during heap compaction, the locked objects are not moved and the accessible objects that are not locked are moved to consolidate free space of the heap.

2. The method of claim 1 wherein the steps of marking each new object that is accessible through a marked object as accessible do not mark those new objects that are accessible from the marked object only through an old object.

3. A method of garbage collection in a computer system, the computer system having a stack and a heap, the heap having a plurality of new objects and a plurality of old objects, the stack having stack entries, each object being identified by a pointer, the method comprising the steps of:

when an old object contains a pointer that is set to point to a new object, remembering the old object; and during garbage collection, identifying each stack entry as definitely not a pointer or as possibly a pointer;

marking each new object possibly pointed to by a stack entry identified as possibly a pointer as accessible and locked;

marking each new object pointed to by a remembered object as accessible;

marking each new object that is accessible through a previously marked object as accessible; and reclaiming the memory used for new objects not marked as accessible by moving new objects that are accessible and not locked and by not moving objects that are accessible and locked.

4. A method of memory compaction in computer system, the computer system having a memory, the memory having a multiplicity of memory locations, the memory for storing a plurality of objects, each object having a size indicating the number of memory locations that comprise the object, each object being accessible or inaccessible, each accessible object being locked or not locked, the objects being ordered from a first object to a last object, each object that is accessible and not locked having a reference pointer that points to the object, the method comprising the steps of:

initializing a memory pointer to point to the first object in the memory; and for each object in the memory, starting with the first object and proceeding in order to the last object, selecting the object; and when the selected object is accessible and not locked, when the size of the selected object is such that the selected object can be copied to the memory locations starting at the memory location pointed to by the memory pointer without overwriting a locked object, copying the selected object to the memory locations starting with the memory location pointed to by the memory pointer; and when the size of the selected object is such that the selected object cannot be copied to the memory locations starting at the memory location pointed to by the memory pointer without overwriting a locked object, copying the selected object to the memory locations starting with the memory location after the locked object;

updating the reference pointer to the selected object, so that the reference pointer points to the copied object; and advancing the memory pointer to point to a memory location after the copied object.

5. The method of claim 4 including the additional steps of:

when the size of the selected object is such that the selected object cannot be copied, storing a dummy object starting at the memory pointed to by the memory pointer, such that the size of the dummy object does not overwrite a locked object; and advancing the memory pointer to point to a location after the locked object.

6. A method of memory compaction in computer system, the computer system having a memory with a multiplicity of memory locations and a plurality of objects, each object comprising one or more memory locations, the objects being ordered from a first object to a last object, each object being accessible or inaccessible, each accessible object being locked or not locked, each object that is accessible and not locked having a reference pointer that points to the object, the method comprising the steps of:

moving a plurality of accessible objects, wherein accessible objects that are not locked are moved, and wherein accessible objects that are locked are not moved and wherein the ordering of the accessible and not locked objects is maintained after moving; and adjusting the reference pointer of each moved object to point to the moved to location.

7. The method of claim 6 wherein the step of moving moves the accessible and not locked objects to memory locations previously occupied by an accessible and not locked object already moved or by an inaccessible object.

8. A garbage collector in a computer system comprising:

a stack located in computer memory having a plurality of stack entries;

a heap located in the computer memory having a plurality of new and old objects;

a remember list identifying old objects that contains pointers to new objects;

a process stack pointer routine wherein each stack entry is identified as being either possibly a pointer or not a pointer to a new object;

a process possibly a pointer routine wherein each new object pointed to by a stack entry that is identified as possibly a pointer is marked as accessible and locked;

a process remember list routine wherein new objects pointed to by an old object identified in the remember list are marked as accessible;

a check embedded pointers routine wherein new objects that are accessible through a new object that is marked as accessible are marked as accessible; and a reclamation routine wherein each object that is not marked as accessible is reclaimed by moving accessible objects, wherein accessible objects that are not locked are moved and accessible objects that are locked are not moved.

9. A method for garbage collecting in a computer system having a stack with stack entries and having a heap with new and old objects, the method comprising the steps of:

conservatively determining whether each stack entry is a pointer to an object;

remembering which old objects contain pointers to new objects;

reclaiming new objects that are not accessible through a stack entry conservatively determined to be a pointer and that are not accessible through a remembered old object;

and coalescing the heap by moving new objects that are accessible but not pointed to through a stack entry conservatively determined to be a pointer, wherein the objects of the heap have a relative position to one another and wherein the moving of new objects maintains the relative position of the moved objects.

10. The method of claim 9 wherein an object contains a data member and including the step of definitely determining whether the data member contains a pointer to a new object.

11. A garbage collector for a computer system having a stack and a heap, the stack having stack entries, the heap having new and old objects, comprising:

means for conservatively determining whether each stack entry points to a new object;

means for tracking old objects that contain pointers to new objects;

means for reclaiming new objects that are not accessible through a stack entry conservatively determined to be a pointer and that are not accessible through an old object that contains a pointer to a new object; and means for coalescing the heap by moving new objects that are accessible but not pointed to through a stack entry conservatively determined to be a pointer, wherein the objects of the heap have a relative position to one another and wherein the means for reclaiming new objects maintains the relative position of the moved objects.

12. The garbage collector of claim 11 wherein an object contains a data member and including means for definitely determining whether the data member contains a pointer to a new object.

13. A method of garbage collection in a computer system, the computer system having a heap, the heap having a plurality of objects, the computer system having a plurality of data values that are definitely references to objects and plurality of data values that are possibly references to objects, the method comprising the steps of:

marking each object possibly referred to by a data value as accessible and locked;

marking each object definitely referred to by a data value as accessible;

marking each object that is accessible through a previously marked object as accessible; and compacting the heap wherein objects that are locked are not moved and objects that are accessible and not locked are moved so as to coalesce portions of the heap that are not accessible.

14. The method of claim 13 wherein the computer system includes a stack and the data values that are possibly references to objects are contained within the stack.

15. The method of claim 13 wherein the step of compacting includes the step of moving objects that are accessible and not locked wherein the relative position of the moved objects is maintained.

16. The method of claim 13, including the step of designating each object as either old or new, and wherein the step of marking each object definitely referred to by a data value as accessible includes the step of marking only those new objects that are accessible from an old object and wherein the step of compacting includes the step of moving only new objects.

* * * * *